Patented June 30, 1953

2,643,981

UNITED STATES PATENT OFFICE 2,643,981

METHOD OF MAKING SPONGE RUBBER WITH THE AID OF AMINES

John H. Kelly, Jr., Wabash, Ind., assignor to The General Tire and Rubber Company, Akron, Ohio, a corporation of Ohio Application May 15, 1947, Serial No. 748,280

9 Claims. (Cl. 260—2.5)

This invention relates to an improved chemically blown sponge rubber and to a method of making cellular or sponge rubber from milled or masticated rubber. It particularly relates to a sponge method of making the open celled sponge rubber products by blowing a masticated solid rubber or synthetic rubber such as the rubbery butadiene-styrene copolymers.

It has heretofore been proposed to prepare sponge rubber from rubbery polymers and copolymers by plasticizing the rubbery material and incorporating into the rubbery material chemical blowing agents which release carbon dioxide at temperatures within the rubber curing range. The cellular rubber produced by the process heretofore proposed has, however, not been entirely satisfactory for the reason that the density was almost invariably higher than desirable and the pores in the rubber were not uniform, large void spaces often being formed in certain portions of the sponge rubber with the result that the article was unsuitable for commercial use.

It has also been proposed to prepare closed cell sponge rubber articles by incorporating a curable plastic rubber in a cavity containing gas under pressure, partially curing the plastic rubber while simultaneously permitting it to absorb gas, such as nitrogen and carbon dioxide under high pressure, then releasing the pressure to permit the partially cured rubber to fill the cavity by expansion and completing the curing operation.

While the product produced by this process usually has quite uniform cells, if the rubber is sufficiently thin to permit relatively uniform gas absorption, utilization of such high pressure gas during the curing operation is not usually desirable.

While natural rubber compounds have been successfully used by both of the above processes for the preparation of commercial sponge rubber articles, it has been almost impossible to commercially prepare high grade sponge rubber articles from synthetic rubber such as rubbery copolymers of butadiene and arylvinyl compounds, for the reason that these materials have been exceedingly difficult to chemically blow in any satisfactory manner.

It is an object of the present invention to provide a method of making sponge rubber articles by blowing a masticated rubber wherein a relatively uniform pore size and a relatively low density sponge is obtained.

It is another object of the present invention to provide a method of making either closed cell or open cell sponge rubber articles from synthetic rubbers wherein it is unnecessary to utilize a cavity filled with high pressure gas in the curing process.

It is another object of the present invention to provide a method of making chemically blown open cell sponge rubber articles from butadiene-styrene copolymers wherein the cell formation is more uniform.

It is still another object of the present invention to provide a high quality chemically blown sponge rubber comparable in quality and density to sponge produced from frothed latex.

I have found that the factors which influence or largely determine the quality or character of sponge rubber include the permeability of the rubbery material to the blowing agent, the distribution, stability and solubility of the blowing agent through the matrix and the relative stage of the curing process at which the blowing gas is largely released.

The permeability or the impermeability of the rubber to the blowing agents seems to depend not only on the composition or type of blowing agent and the empirical composition of the polymer but surprisingly, on the physical structure or size of the polymer molecules and the manner in which they are joined together. When carbon dioxide, which usually diffuses quite rapidly through rubbery materials, particularly vulcanizable hydrocarbon rubbers such as natural rubber and synthetic rubbers, such as butadiene-styrene copolymers and the like, is utilized as a blowing agent in preparing the sponge rubber, I have surprisingly found that the amount and size or character of gel or cross-linked polymer in the rubbery mass largely determines the density which it is possible to obtain upon blowing and cure.

For the production of a low density carbon dioxide blown sponge rubber, that is, one having a density less than .15 ounce per cubic inch, I have found that the polymers must be chemically plasticized (i. e., plasticized by mastication in presence of a chemical peptizing agent) and must have certain structural properties. They must have gel rubber contents and dilute solution viscosities within certain limits. The physical structure of the rubber, that is, the amount and character of gel or cross-linked portion in relation to the plastic noncross-linked portion which is often termed the sol portion, as well as the character of the sol portion, may be readily determined by standard methods promulgated by Rubber Reserve Corporation, which methods involve extracting the noncross-linked or soluble rubber from the tough cross-linked rubber by means of a solvent for the polymer, filtering and weighing the separated portions. Such extraction readily gives the proportions of the cross-linked or tough rubber material and the proportions of soluble or non-crossed link plastic polymeric material. The character of the sol portion is empirically measured by measuring the dilute solution viscosity of the solutions formed by the rubbery polymer. Specifically, the recommended procedure is to add .4 gram of thinly sheeted rubbery polymer to a bottle containing 100 cubic centimeters of pure benzene, and after allowing the bottle to remain in a dark room for forty-eight hours, filtering the resultant solution through 100-mesh screen and collecting the filtrate. 25 cc. of the filtrate thus collected is evaporated to dryness and weighed. The amount of gel is the weight of the original sample, minus four times the weight of the residue remaining after such evaporation of the solvent. The dilute solution viscosity is obtained by measuring the ratio of the time required for a given amount of the aforementioned filtrate to flow through a given capillary to the time required for the same amount of pure benzene to flow through the same capillary; dilute solution or intrinsic viscosity is then equal to 2.3 times the log (base 10) of the above ratio, divided by the concentration in grams of polymer per 100 cc. of the above filtrate.

To prepare a sponge of extremely low density with carbon dioxide as the blowing gas I found that the percentage of gel should be relatively somewhat smaller than the amount of sol or non-cross-linked rubber and that the dilute solution viscosity should be less than 1.20 and preferably between .65 and .85 as measured by standard Government procedures as above described.

The action of the gel or cross-linked rubber is not fully understood. It is peculiar to synthetic rubbers, especially oil soluble synthetic rubber such as GR-S (the copolymers of butadiene and styrene) and similar polymers. The gel rubber is apparently less permeable to the carbon dioxide than the plastic noncross-linked rubber material. In any event when the amount of gel is less than about 14% or more than 46% of the rubbery polymer, I have been unable to produce by carbon dioxide blowing a sponge of a density less than .15 ounce per cubic inch. With less than 14% gel the polymer became too permeable to carbon dioxide to permit formation of a low density product from rubbers such as GR-S, and when the amount of gel became greater than about 46%, the polymer did not blow to a low density. On the other hand, when the amount of gel was between 14% and 46% and the dilute solution viscosity was less than 1.2, sponge rubber was readily obtained from GR-S, having a density of around .10 ounce or less per cubic inch.

The polymer containing the desired gel and dilute solution viscosity characteristics may be formed by masticating rubber polymers, such as GR-S, etc., for various periods of time. The amount of gel present in the polymer may be increased by increasing the amount of mastication within reasonable limits.

Another feature of the present invention deals with the attainment of uniform blow or uniform density throughout the mass of rubber. I have found that the uniformity of a blow throughout a mass of sponge rubber depends on the way the blowing agent is carried or distributed throughout the rubber and that to produce a uniform chemically blown sponge an agent soluble in the rubber is desirable to carry or distribute the blowing agent through the rubbery mass.

Amines which are soluble in rubber or hydrocarbon oils when present in sufficient amount admirably perform the function of carrying or distributing carbon dioxide uniformly throughout the rubbery polymer. The total amount of such amines should ordinarily be present in amounts of at least two per cent to be appreciably effective, and more than two per cent is usually required to obtain a commercially satisfactory article. When at least one of the amines has four, or preferably five or six or more carbon atoms for each strong polar or hydrophilic group such as hydroxyl, sulfonic acid, sulfonate, carboxyl, etc., the amine or mixture becomes more rubber soluble and a superior product is produced.

The amines form a reaction product with carbon dioxide that is relatively stable at ordinary temperatures but releases carbon dioxide in desired form at suitable elevated temperatures such as those encountered in the curing of rubbers. The stability of the amine carbon dioxide reaction product is illustrated by the fact that after its formation either by subjecting the rubber amine mix to carbon dioxide under pressure for a suitable period or by reacting the amine directly with the carbon dioxide or a carbon dioxide producing compound, such as sodium carbonate, the rubber mixture containing the reaction product may be milled to break up the gas bubble structures, slabbed and cut to dimension and finally cured to produce articles of a desired shape. Carbon dioxide treated amine rubber compounds may even be milled on successive days without appreciable loss of inflation activity. Because of the stabilizing and solubilizing effect of such amines the density or degree of blow throughout the sponge rubber product is relatively uniform regardless of whether the plasticized polymer has a gel content and dilute solution viscosity within the aforementioned limits required for the production of exceedingly low density sponge.

In accordance with still another aspect of the present invention, I have found that the size of the pores as distinguished from minimum density and uniformity of blow or expansion is determined by the structure or type of the amine or amine compound. I have found that the sizes of the pores in the resultant rubber may readily be regulated by the proportion of primary aliphatic amine or primary alkylamine relative to the secondary aliphatic or alkylamine.

I believe that this phenomenon is due to the influence of structure of the amine on the curing rate of the polymer or rubber. The primary aliphatic amines while acting as carbon dioxide carriers also apparently act as retarding agents, and when the carbon dioxide is released the initial stages of curing or setup have not yet passed so that the polymer is still highly plastic, with the result that adjacent pores tend to coalesce to some extent and relatively large pores are produced.

In the case of the secondary aliphatic amines, such as the secondary and even tertiary alkylamines, etc., the retarding action is reduced or may be ineffective, with the result that the initial stages of curing or setup in the rubbers passed before the blowing agent is released in sufficient extent to cause coalescence of adjacent pores. The pore structure in the finished product is therefore exceedingly fine. By regulating the proportions of primary alkylamines relative to the more alkaline secondary aliphatic (preferably secondary alkyl) amines, the pore size of the rubber may be varied, as desired.

This is illustrated by the accompanying photograph in which Figure 1 shows a photographic sectional view, enlarged four times, through a synthetic rubber sponge blown from a synthetic rubber containing a primary amine alone.

Figure 1:
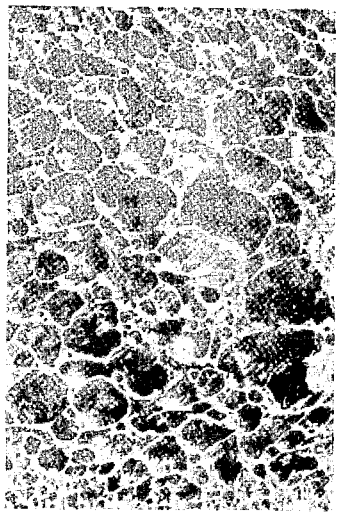

The preferred amines and amine mixtures are those possessing oil compatibility and hydrocarbon compatibility so that they have thorough compatibility with the natural or Hevea rubbers and the various copolymers of butadiene with arylvinyl compounds, such as styrene, alpha-methylstyrene and the like. These oil-soluble amines may be mixtures of one or more amines, some of which like isopropylamine, etc. are insoluble or relatively insoluble in oily rubber and the like, and some of which are rubber-soluble and facilitate solubility of the insoluble amine. Oil-soluble amines include the straight chain alkyl and dialkylamines having five or more carbon atoms in the chain. Branch chain groups and groups containing hydroxylamine and amino groups are generally somewhat less soluble than the straight chain amines of the same number of carbon atoms. The presence of a strong polar group, such as a hydroxyl group or sulfonic acid group, particularly on a terminal carbon atom, also reduces the oil solubility. It is, therefore, desirable that the amines have five or six, or more, carbon atoms for each polar group other than amine group on a terminal carbon. However, irrespective of the structural configuration or polarity characteristics, so long as hydrocarbon or oil solubility or compatibility is present in the amine and so long as the amine group is reactive with carbon dioxide, any aliphatic or alkyl, aralkyl or heterocyclic amine is usable.

Examples of the preferred amines are the aliphatic amines of more than four carbon atoms, including the primary alkylamines such as amyl, hexyl, heptyl, octyl, hexadecyl, octadecyl and dodecyl amines, 2-amino ethyl hexane, 1-amino nonane, 1-amino heptane, 2-amino heptane and 2-amino octane, 2-ethyl-1-amino hexane and the saturated cyclic amines such as cyclohexylamine, etc.; the secondary alkylamines including diamyl, diheptyl, dihexyl, dicyclohexyl and dioctyl amines, etc.; the tertiary nonpolar alkylamines such as triamyl, trihexyl and trioctyl amines; and the heterocyclic amines. Besides these preferred amines, other amines such as the substituted aralkylamines, the aminoiminos such as diethylene triamine, triethylene tetramine, and tetraethylene pentamine, etc., amine-hydroxylamines such as aminoethyl ethanolamine, etc. may be used.

The reaction of primary alkylamines with carbon dioxide results in the formation of a reaction product. The reaction product of carbon dioxide and the secondary alkylamines can be classified as the dialkyl amino salts of carbonic acid and those of the tertiary alkyl amines as

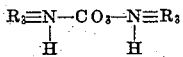

When the terminal groups are methyl or are free from polar groups, other than amine, such tertiary amines and their carbon dioxide reaction products are easily absorbed within the rubber of rubberlike polymers. This mixing advantage of the oil-soluble amines and their carbon dioxide reaction products sharply contrasts with the difficulty in mixing amines such as the mono-, di- and tri-2-hydroxyethylamines, which have terminal hydroxyl groups and have been used as carbon dioxide absorbents. Ordinarily, mixing this type of oil-insoluble reagent into suitable inflatable, oil-compatible rubbery compounds creates both slippage and poor pickup by the compound. Such a condition also characterizes many otherwise usable amines such as hydroxyethyl ethylene diamine, and tri-2-hydroxy isopropylamine, etc. heretofore proposed for inflation stabilizers. The mixture of one or more of these compounds or of propyl or isopropylamine with an oil-soluble amine such as one or more primary and secondary alkylamines is highly desirable and mixtures of isopropylamine for example with a primary and secondary alkylamine, for example, hexylamine and dihexylamine, or other primary and secondary oil-soluble aliphatic amine of six or more carbon atoms is especially suitable for the practice of the present invention.

If it is desired to use for carbon dioxide stabilization an amine which is not miscible with hydrocarbons such as rubber and GR–S (the rubbery butadiene-styrene copolymers), an oil capable of dissolving the amine and thus acting as coupling solvents may also be used in admixture therewith. By the combination of any oil or plasticizer miscible both with the amine and the rubbery polymer, even rubber-insoluble amines such as monoethanol, diethanol and triethanol amines may be used as carbon dioxide stabilizers.

The sulfur-vulcanizable synthetic rubbers, such as copolymers of butadiene or butadiene compounds like butadiene-1,3, isoprene, piperylene, dimethyl butadiene with arylvinyl compounds, such as styrene and the like, are particularly desirable for the production of good quality sponge rubbers in accordance with the present invention. The present invention, however, may be utilized to produce excellent quality sponge rubbers with natural rubber and other synthetic rubbers.

In preparing the sponge rubbers of the present invention the rubber polymer is compounded with curing agents and with the amines or amine carbon dioxide reaction product by mastication on a mill or Banbury mixer, as is usual practice.

While the use of a substantial amount of pigments is not considered desirable in the preparation of ordinary sponge rubber or even in the preparation of latex formed sponge rubber, I found that excellent sponge rubbers of a very low density may be produced in accordance with the present process when 25% to 50% (based on the rubbery material) of a pigment having an average particle size of 25 millimicrons or preferably 35 millimicrons or over is used. Indeed, pigments such as whiting, gastex, calcium carbonate, and even semi-reinforcing carbon blacks in amounts of 25% to 50% of the weight of the rubbery material enhance sponge rubbers produced in accordance with my process. Even more than 50% of pigment may be used and as much as 75% or 80% are often used to facilitate handling of the plasticized mixtures.

In addition to the action of the rubber-soluble amine and amine compounds in distributing gaseous blowing material uniformly through the rubber so that relatively uniform low density cellular sponge rubber may be produced, I have found that the amines also assert a marked plasticizing action on the rubber and greatly facilitate mechanical breakdown. This is particularly the case with the synthetic rubbers, such as copolymers of butadiene and styrene and other oil-swellable rubbery polymeric materials. The amines may be masticated with the rubber in suitable masticating apparatus to provide the increased plasticity without the aid of other plasticizing agents, or if desired other rubber-peptizing agents or plasticizing agents, such for example as xylyl mercaptans, dibenzamido diphenyl disulfide, etc., may also be present. In the plasticization of the rubbery polymers alone, about 3% to about 10% of the aliphatic rubber-soluble amines are preferred.

As aforementioned, more than 2% (based on the rubber) of the rubber-soluble amines are required to have appreciable effect on distributing the carbon dioxide in the preparation of sponge rubber. Larger amounts such as 3% or 4% or more are often desirable for the preparation of lower density sponge rubbers. More than 10% or 15% of the amine (based on the rubber) is usually not considered economically practical, however.

The following examples, in which parts are by weight, illustrate the invention:

EXAMPLE 1

Two separate batches of plasticized GR-S rubber were prepared by masticating in a Banbury the amounts and materials as shown in the following table:

|  | Batch A | Batch B |
|---|---|---|
| Standard GR-S | 100 | 100 |
| Whiting | 50 | 50 |
| Dibenzamido diphenyl disulfide | 2 | 1 |
| Xylyl Mercaptan | | 1 |

Both batches A and B were Banbury processed for twenty minutes at 270–280° F. The gel characteristics of the plasticized mixes thus obtained were measured in accordance with standard Rubber Reserve procedures, as aforementioned. Batch A was found to have a Mooney viscosity of 17 and gel and dilute solution viscosities of 35% and .81, respectively. Batch B was found to have a Mooney viscosity of 18, a gel content of 25.9%, and a dilute solution viscosity of 1.05.

Each of the plasticized rubbers was then compounded, as shown in Table 1, to form sponge rubber compounds.

*Table 1*

|  | Parts | |
|---|---|---|
|  | A | B |
| Plasticized base A | 152 |  |
| Plasticized base B |  | 152 |
| Zinc oxide | 5 | 5 |
| Sulfur | 4 | 2.5 |
| Stearic acid | 5 | 5 |
| Oleic acid |  | 11 |
| Sodium bicarbonate | 22 | 22 |
| Light process oil | 25 | 25 |
| Proprietary plasticizing oil [1] | 10 | 10 |
| Antioxidant ditolylamines | 1 | 1 |
| Butyraldehyde aniline | .6 | .6 |
| Tetramethyl thiuram monosulfide | .06 | .06 |
| Hexylamine | 4 | 4 |

[1] The proprietary plasticizing oil is that product commercially available as "Plastogen" and consists essentially of 98 parts of mineral oil, 0.4 part of N-butyl alcohol and 1.6 parts of a sulfonated petroleum product.

The rubber compounds thus formed were sheeted out and different amounts incorporated in disc molds having a diameter of 1.5" O. D. and a height of .75 inch. The curing time was twenty minutes at 307° F. The sponge of lowest density that completely filled the mold was thus ascertained. That sponge obtained from batch A weighed .11 ounce per cubic inch; that sponge obtained from batch B weighed .12 ounce per cubic inch.

EXAMPLE 2

Sponge rubbers were prepared in the same way as in Example 1 except that the amines were omitted, other ingredients and the mixing time being otherwise the same. The products obtained had a minimum density of .22 ounce per cubic inch.

EXAMPLE 3

The GR-S of Example 1 was plasticized with dibenzo amido diphenyl disulfide and masticated to the point that the polymer contained 51.5% gel and had a dilute solution viscosity of .81. The polymer was compounded exactly as in Example 1, batch A, and the minimum density of the cured sponge produced therefrom was .17 ounce per cubic inch.

EXAMPLE 4

Standard GR-S rubber was processed in a Banbury for six minutes at 300° F. in the presence of 2% dibenzo amido diphenyl disulfide. The very plastic rubbery compound thus produced had a zero gel content and a dilute solution viscosity of 1.53. The masticated rubber thus obtained was compounded and cured in the same way as was batch A of Example 1. Densities below .19 ounce per cubic inch were not obtained. When the amine was eliminated, the preparation and compounding being otherwise the same, the same density was obtained but the blow was less uniform.

EXAMPLE 5

Four separate batches of standard GR-S rubber were compounded with the amounts of the ingredients shown by Table 2 as follows:

*Table 2*

|  | Batch A | Batch B | Batch C | Batch D |
|---|---|---|---|---|
| GR-S standard | 100.00 | 100.00 | 100.00 | 100.00 |
| Dibenzamido diphenyl disulfide | 2.00 | 2.00 | 2.00 | 2.00 |
| Whiting | 50.00 | 50.00 | 50.00 | 50.00 |
| Zinc Oxide | 5.00 | 5.00 | 5.00 | 5.00 |
| Stearic acid | 5.00 | 5.00 | 5.00 | 5.00 |
| Agerite Gel (ditolylamines) | 1.00 | 1.00 | 1.00 | 1.00 |
| Tetramethyl thiuram monosulfide | .06 | .06 | .06 | .06 |
| Butyraldehyde amine condensation product | .60 | .60 | .60 | .60 |
| Light process oil | 25.00 | 25.00 | 25.00 | 25.00 |
| Proprietary plasticizing oil | 10.00 | 10.00 | 10.00 | 10.00 |
| Sulfur | 2.50 | 2.50 | 2.50 | 2.50 |
| Sodium bicarbonate | 22.00 | 22.00 | 22.00 | 22.00 |
| Hexylamine | 4.00 | 3.00 | 2.00 |  |
| Dihexylamine |  | 1.00 | 2.00 | 4.00 |

The quantity of amine compounds in each batch was identical.

The ingredients in each batch were plasticized for twenty minutes at 270–280° F. in the presence of the plasticizing agent and the whiting. In mixing the compounds, the amines were first added, followed by the remaining compounds in the order named. The percentage of gel in each masticated polymer was between 14% and 46%, and the dilute solution viscosity was less than 1.10. Slabs cut to fit a 4 x 4" mold from stock of the same thickness were vulcanized in a press at 320° F. The density of sponge was .15 ounce per cubic inch as the thickness of the expanded product was limited to one inch. The samples were cut and photographs were taken of the cut section and enlarged four times to show the structure.

Figure 2:
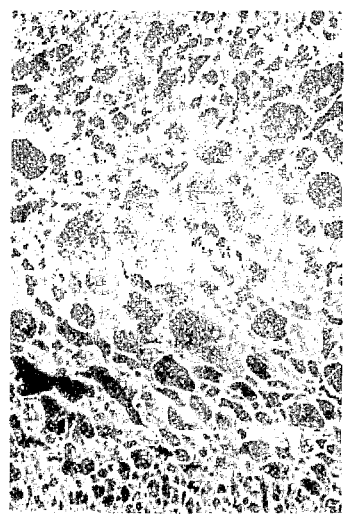
Figure 2 is a similar photographic sectional view through a synthetic rubber sponge blown of the same composition except that the primary amine was substantially a mixture of 75% primary amine and 25% secondary amine.
Figure 3:
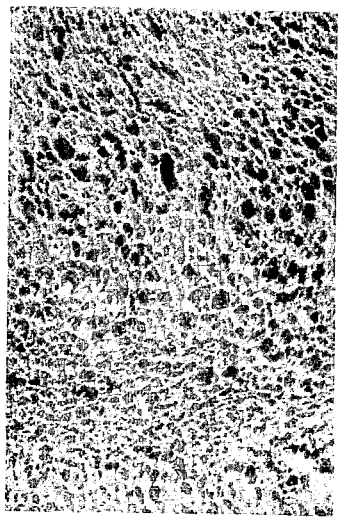
Figure 3 is a similar sectional view through a synthetic rubber sponge of the same composition as illustrated in Figures 1 and 2 except that the amine was substituted by a mixture of equal parts of primary amine and secondary amines.
Figure 4:
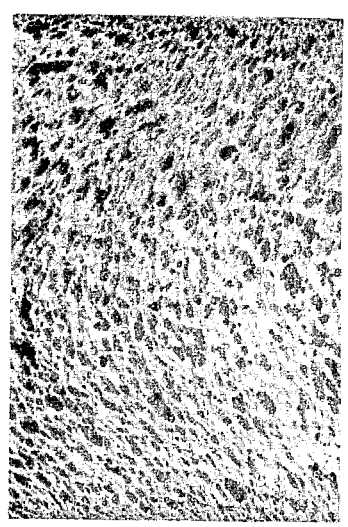
Figure 4 is a similar sectional view through a sponge identical in composition with that of Figure 1 except that only a secondary amine was present.

The photographs of the cellular structure of the sponges produced from batches A, B, C and D are respectively shown in Figures 1 to 4 of the drawing.

It may be seen that a relatively coarse open structure was obtained by the primary amine alone, probably because of its retarding action on vulcanization and the resultant delay in the initial firming up of the rubbery polymer. As the amount of secondary amine is increased to 50% the pores become smaller. The pore size most desirable for many applications is obtained with about equal primary and secondary amine contents. By adjusting the percentage of primary and secondary (or other more alkine amine) the cellular structure may be adjusted as desired.

In the foregoing examples sodium bicarbonate has been used as the inflating agent. Other carbon dioxide producing substances such as ammonium carbonate, ammonium carbamate and ammonium bicarbonate may be used.

In accordance with still another aspect of the present invention, I have found that the preparation of sponge rubber compounds is usually faciliated when the blowing agent is formed outside of the rubber, i. e., when the amine and carbon dioxide-producing compound are mixed together prior to incorporation in the rubbery material. I have found that especially desirable blowing agents may be made by mixing a pigment, preferably one like zinc or magnesium oxide having an average particle size greater than 35 millimicrons, with the amine-carbon dioxide product. Oils and plasticizers may also be simultaneously present.

The pigment should preferably be present in amounts greater than the weight of the amine and carbon dioxide-producing compound. Compositions comprising a pigment and an oil-soluble amine in which the pigment is present in amounts five to twenty-five times the weight of the amine or mixture of primary and secondary amines are most desirable.

The hydrocarbon or oil compatible amines may also be used to stabilize the various types of sponge rubbers against wild blowing whether or not they are used as part of the blowing agent. They are effective in preventing the wild blowing of soda blown sponge produced from any compounded rubber.

The term "hydrophilic group" is defined on page 26 of the book entitled "Wetting and Detergency," published in 1937 by the Chemical Publishing Company of New York, Inc.

It is to be understood that variations and modifications of the invention herein shown and described may be made without departing from the spirit of the invention.

What I claim is:

1. In a method of producing a cellular rubberlike material wherein a hydrocarbon rubbery polymer of a conjugated butadiene which polymer is in a plastic form, is mixed with a blowing agent and a curing agent, and cured in a mold with the aid of heat under conditions imparting an increase in volume, the steps which comprise dispersing through the plastic rubbery polymer prior to curing a member of the group consisting of amines having an aliphatic group connected directly to the amine nitrogen and which are highly soluble in hydrocarbon oils, and mixtures of carbon dioxide producing materials and such amines, said amine group members being present in total amounts greater than 2% and not exceeding 15% by weight of the rubbery polymer, and said group members containing a carbon-to-carbon chain of at least five carbon atoms exclusive of that directly carrying the amine nitrogen per hydrophilic group, and thereafter heating the mixture thus formed to sufficient temperature to release gas therein and cause expansion of said mixture, and vulcanizing said mixture in expanded form.

2. In a method of producing a cellular rubberlike material wherein a hydrocarbon rubbery polymer of a conjugated butadiene which polymer is in a plastic form, is mixed with compounding and curing agents, and cured in a mold under conditions imparting an increase in volume, the steps which comprise dispersing through the plastic rubbery polymer the product obtained by mixing a member of the group consisting of aliphatic and cycloaliphatic amines that have a carbon-to-carbon chain of at least 5 carbon atoms for each hydrophilic group present and are therefore highly soluble in hydrocarbons with carbon dioxide, said amines being present in amounts of at least 2% and not in excess of 15% of the weight of the rubbery polymer, said amines being further characterized by always having at least five carbon atoms, thereafter heating the mixture to sufficient temperature to release carbon dioxide from said reaction product and cause expansion of said mixture, and vulcanizing said mixture in expanded form, whereby carbon dioxide is distributed by said amine relatively uniformly throughout the rubberlike material.

3. The method of preparing a sponge rubber wherein a hydrocarbon rubbery polymer of a conjugated diolefine of less than six carbon atoms which polymer is prepared in relatively plastic form, masticated, compounded with vulcanizing agents, and cured under conditions permitting an increase in volume, the steps which comprise incorporating in the plastic rubbery polymer an aliphatic amine in an amount greater than 2% and not in excess of 15%, based on the weight of said rubbery polymer, said amine having at least five carbon atoms and having at least 5 carbon atoms for each hydrophilic group other than terminal amine group whereby it is highly soluble in hydrocarbon oils, said 5 carbon atoms together with that carrying the amine nitrogen forming a chain of at least 6 carbon atoms connected carbon-to-carbon, subjecting the polymer-amine mixture to a member of the group consisting of carbon dioxide and carbon dioxide-producing materials, thereafter subjecting said mixture to an elevated temperature to cause release of said carbon dioxide and expansion of the rubbery polymer, and curing the rubbery polymer in expanded condition, whereby the carbon dioxide is distributed by said amine in the rubbery polymer.

4. The method of claim 1 wherein the rubbery polymer is a copolymer of butadiene and a styrene and prior to the vulcanizing step has an intrinsic viscosity in benzene below 1.20 and a gel content between about 14% and about 46% by weight.

5. In a method of producing sponge rubber wherein a rubbery copolymer of essentially a combined hydrocarbon conjugated diolefinic compound of less than six carbon atoms and a combined hydrocarbon styrene is prepared in plastic form, compounded, and cured in a mold under conditions permitting an increase in volume, the steps which comprise incorporating in said plastic copolymer a mixture of a primary amine and a secondary amine of the formula

where R and R' are aliphatic groups, each of which amines is highly soluble in hydrocarbons and contains at least 5 carbon atoms and at least 5 carbon atoms for each hydrophilic group present, incorporating a carbon dioxide-producing compound in said mixture, thereafter heating the mixture at a temperature sufficient to cause release of the carbon dioxide and expansion of the rubbery copolymer, said mixture of amines being present in amounts of between 2% and 15% of the weight of said rubbery copolymer and curing the rubbery copolymer in expanded condition, said rubbery copolymer being characterized prior to the vulcanizing and heating steps by having an intrinsic viscosity in benzene of less than 1.20 and a gel content between 14% and 46% by weight, said amines having at least 5 carbon atoms per hydrophilic group.

6. In a method of producing sponge rubber wherein a hydrocarbon rubbery copolymer consisting essentially of a combined butadiene and a conjugated hydrocarbon styrene is prepared in plastic form, compounded, and cured in a mold under conditions permitting an increase in volume, the steps which comprise incorporating in said plastic copolymer more than 2% and less than 15% by weight of a primary, aliphatic amine that contains at least five carbon atoms and is further characterized by having 5 carbon atoms per hydrophilic group other than a terminal amine group, whereby it is highly soluble in hydrocarbons, at least 5 of said carbon atoms together with that carrying the amine group forming a chain of at least 6 carbon atoms linked carbon to carbon throughout, incorporating a carbon dioxide-producing compound in said mixture, thereafter heating the mixture at a temperature sufficient to cause release of the carbon dioxide and expansion of the rubbery copolymer, and curing the rubbery copolymer in expanded condition, said rubbery copolymer being characterized prior to the vulcanizing and heating steps by having an intrinsic viscosity in benzene of less than 1.20 and a gel content between 14% and 46% by weight.

7. In a method of producing sponge rubber wherein a rubbery copolymer consisting essentially of combined butadiene and styrene is prepared in plastic form, compounded, and cured in a mold under conditions permitting an increase in volume, the steps which comprise incorporating in said plastic copolymer a mixture of a primary, aliphatic amine and a secondary, aliphatic amine, each of which has at least five carbon atoms all connected together in a single carbon-to-carbon chain and is further characterized by having at least 5 carbon atoms per hydrophilic group other than terminal amine group whereby it is highly soluble in hydrocarbons, incorporating a carbon dioxide-producing compound in said mixture, thereafter heating the mixture at a temperature sufficient to cause release of the carbon dioxide and expansion of the rubbery copolymer, and curing the rubbery copolymer in expanded condition, said mixture of primary and secondary aliphatic amines being present in amount of between 2% and 15% of the weight of said rubbery copolymer, said rubbery copolymer being characterized prior to the vulcanizing and heating steps by having an intrinsic viscosity in benzene of less than 1.20 and a gel content between 14% and 46% by weight.

8. In a method of producing a cellular rubber-like material, wherein a rubbery hydrocarbon polymer of a conjugated diolefine of less than six carbon atoms and in a plastic form is mixed with compounding a curing agent, expanded by release of carbon dioxide and cured under conditions imparting an increase in volume, the steps which comprise distributing through the rubbery polymer prior to the curing operation a pigment and a member of the group consisting of aliphatic and cycloaliphatic amines which has at least five carbon atoms and is further characterized by having at least 5 carbon atoms for each hydrophilic group other than terminal amine group whereby it is highly soluble in hydrocarbon oils, at least 5 of said carbon atoms together with that carrying the amine group being connected directly together in a carbon-to-carbon chain, said amine being present in amounts greater than 2% and less than 10% by weight of the rubbery polymer, and thereafter curing the polymer mixture, said pigment having an average particle size of at least 35 millimicrons, such pigments being present in a total amount of at least 25% by weight of the rubbery material.

9. The method of claim 1 in which there is present a product obtained by mixing with a primary aliphatic amine a material which evolves $CO_2$ and a product obtained by mixing with a secondary aliphatic amine a material which evolves $CO_2$ upon heating.

JOHN H. KELLY, Jr.

References Cited in the file of this patent

UNITED STATES PATENTS

| Number | Name | Date |
|---|---|---|
| 1,912,591 | Olin | June 6, 1931 |
| 2,017,217 | Minor | Oct. 15, 1935 |
| 2,130,948 | Carothers | Sept. 20, 1938 |
| 2,234,204 | Starkweather | Mar. 11, 1941 |
| 2,299,593 | Roberts | Oct. 20, 1942 |
| 2,320,818 | D'Alelio | June 1, 1943 |
| 2,386,273 | Shonle et al. | Oct. 9, 1945 |
| 2,400,543 | Denman | May 21, 1946 |
| 2,460,600 | Sarbach | Feb. 1, 1949 |
| 2,466,027 | Horney et al. | Apr. 5, 1949 |
| 2,478,879 | Ten Broeck | Aug. 9, 1949 |
| 2,592,708 | Kelly | Apr. 15, 1952 |

OTHER REFERENCES

Gould Rubber Age, April 1944, pp. 65–67.

White Ind. and Eng. Chem., Aug. 1945, pp. 770–775.

Du Pont Sponge Rubber Compounding Report No. 38-6, June 1938, pages 1-4, pub. by Rubber Chem. Div., Du Pont, Wilmington, Del.

Organic Nitrogen Compounds, Carbide and Carbon Chem. Corp., pp. 6 and 7, pub. 1946.